United States Patent
Barry et al.

(10) Patent No.: US 10,601,685 B2
(45) Date of Patent: *Mar. 24, 2020

(54) VISUALIZATION OF CYCLICAL PATTERNS IN METRIC DATA

(71) Applicant: International Business Machines Corporation, Armonk, NY (US)

(72) Inventors: Paul M. J. Barry, Cork (IE); Anthony T. Brew, Dublin (IE); Felix Y. Chang, Austin, TX (US); Vinh Tuan Thai, Cork (IE)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/021,271

(22) Filed: Jun. 28, 2018

(65) Prior Publication Data
US 2018/0331923 A1  Nov. 15, 2018

Related U.S. Application Data

(63) Continuation of application No. 14/931,907, filed on Nov. 4, 2015, now Pat. No. 10,044,577.

(51) Int. Cl.
*G06F 3/0481* (2013.01)
*H04L 12/26* (2006.01)

(52) U.S. Cl.
CPC .......... *H04L 43/045* (2013.01); *H04L 43/067* (2013.01)

(58) Field of Classification Search
CPC .................................................. H04L 43/045
(Continued)

(56) References Cited

U.S. PATENT DOCUMENTS 5,887,139 A * 3/1999 Madison, Jr. ......... G06F 3/1454
                                                  709/223
6,449,739 B1 * 9/2002 Landan ................. G06F 11/323
                                                  709/224
(Continued)

FOREIGN PATENT DOCUMENTS

WO    2015035086 A1    3/2015

OTHER PUBLICATIONS

Few, Stephen, "Introducing Bandlines: Sparklines Enriched with Information about Magnitude and Distribution"; Perceptual Edge; Visual Business Intelligence Newsletter; Jan./Feb./Mar. 2013; Copyright 2013, pp. 1-7; <http://www.perceptualedge.com/articles/visual_business_intelligence/introducing_bandlines.pdf>.

(Continued)

*Primary Examiner* — Reza Nabi
(74) *Attorney, Agent, or Firm* — Alexander G. Jochym

(57) ABSTRACT

In a method for visualizing cyclical patterns in metric data, receiving, by one or more processors, data relating to a computer environment. The method further includes creating, by one or more processors, a visualization, wherein the visualization presents the data in a first format. The method further includes causing, by one or more processors, the visualization to be displayed in a user interface. The method further includes receiving, by one or more processors, an indication of a user interaction in the user interface, wherein the user interaction indicates an alternative visualization of the data, wherein the alternative visualization presents the data in a second format that includes a fragment of the received data. The method further includes creating, by one or more processors, the alternative visualization.

20 Claims, 5 Drawing Sheets

(58) Field of Classification Search
USPC .......................................................... 715/736
See application file for complete search history.

(56) References Cited

U.S. PATENT DOCUMENTS

| | | | |
|---|---|---|---|
| 6,985,901 B1* | 1/2006 | Sachse | H04L 41/5032 |
| 7,660,823 B2 | 2/2010 | Clover | |
| 8,799,799 B1* | 8/2014 | Cervelli | G06F 3/0481 715/765 |
| 8,873,410 B2* | 10/2014 | Pruthi | H04L 41/22 370/252 |
| 9,666,050 B2* | 5/2017 | Wu | G08B 17/005 |
| 2001/0041566 A1* | 11/2001 | Xanthos | H04L 41/5032 455/423 |
| 2002/0038294 A1* | 3/2002 | Matsugu | G06K 9/00973 706/20 |
| 2004/0064552 A1* | 4/2004 | Chong | G06F 11/3006 709/224 |
| 2004/0111507 A1* | 6/2004 | Villado | H04L 29/06 709/224 |
| 2004/0221296 A1* | 11/2004 | Ogielski | H04L 41/00 719/313 |
| 2005/0261875 A1* | 11/2005 | Shrivastava | G06F 11/0709 702/183 |
| 2006/0085533 A1* | 4/2006 | Hussain | G06F 9/4498 709/223 |
| 2007/0126736 A1* | 6/2007 | Tolle | G06Q 10/10 345/440 |
| 2009/0018994 A1 | 1/2009 | Hajdukiewicz | |
| 2009/0144262 A1* | 6/2009 | White | G06F 16/242 |
| 2009/0282325 A1* | 11/2009 | Radakovitz | G06F 17/246 715/217 |
| 2010/0131494 A1* | 5/2010 | Venolia | G06F 16/9038 707/722 |
| 2011/0288900 A1* | 11/2011 | McQueen | G06Q 10/06311 705/7.16 |
| 2011/0302025 A1* | 12/2011 | Hsiao | G06Q 30/0256 705/14.42 |
| 2012/0232806 A1* | 9/2012 | Srinivasan | G05B 23/0264 702/33 |
| 2013/0055058 A1* | 2/2013 | Leong | G06F 17/246 715/219 |
| 2013/0100136 A1* | 4/2013 | Van Camp | G05B 23/0267 345/440 |
| 2013/0275904 A1* | 10/2013 | Bhaskaran | G06F 16/26 715/771 |
| 2013/0282891 A1 | 10/2013 | Davis et al. | |
| 2013/0339074 A1* | 12/2013 | Nagy | G06Q 10/04 705/7.12 |
| 2014/0043337 A1 | 2/2014 | Cardno | |
| 2014/0049557 A1* | 2/2014 | Hou | G06F 3/0481 345/629 |
| 2014/0100922 A1 | 4/2014 | Aycock | |
| 2014/0115166 A1* | 4/2014 | Kucharczyk | H04L 63/1425 709/226 |
| 2014/0192184 A1* | 7/2014 | Wu | G08B 17/005 348/135 |
| 2015/0066966 A1* | 3/2015 | O'Donnell | H04L 67/10 707/756 |
| 2015/0073894 A1 | 3/2015 | Leaute et al. | |
| 2015/0120959 A1* | 4/2015 | Bennett | H04L 47/10 709/233 |
| 2015/0221111 A1* | 8/2015 | Battista, Jr. | G06T 11/206 345/440.1 |
| 2015/0237085 A1* | 8/2015 | Duncker | G06Q 30/0601 715/753 |
| 2015/0280968 A1* | 10/2015 | Gates | G06F 11/0775 714/37 |
| 2015/0309095 A1* | 10/2015 | Monnerie | G01R 21/133 702/60 |
| 2015/0356061 A1* | 12/2015 | Rampson | G06F 17/241 715/230 |
| 2016/0092509 A1* | 3/2016 | Kang | G06F 16/24539 707/752 |
| 2016/0104329 A1* | 4/2016 | Sundareswara | G01M 17/00 701/33.9 |
| 2016/0179883 A1* | 6/2016 | Chen | G06F 16/24528 707/714 |
| 2016/0358116 A1* | 12/2016 | Cline | G06Q 10/06398 |
| 2017/0039275 A1* | 2/2017 | Akolkar | G06F 16/345 |
| 2017/0085458 A1* | 3/2017 | Paul | H04L 43/12 |
| 2017/0126519 A1* | 5/2017 | Barry | H04L 43/045 |
| 2017/0257290 A1* | 9/2017 | Ogielski | H04L 41/00 |
| 2017/0293685 A1* | 10/2017 | Miller | G06F 16/35 |
| 2018/0024970 A1* | 1/2018 | Mirra | G06Q 40/00 715/210 |

OTHER PUBLICATIONS

Fuchs et al., "Evaluation of Alternative Glyph Designs for Time Series Data in a Small Multiple Setting", ACM; CHI 2013: Proceedings of the SIGCHI Conference on Human Factors in Computing Systems; Apr. 27-May 2, 2013; Paris, France; Copyright 2013, ACM; pp. 3237-3246.

Marty, Raffael, "Visual Security Analysis", Applied Security Visualization; Copyright 2009, Pearson Education, Inc; Crawfordsville, Indiana; p. 171.

Tominski et al., "The TimeViz Browser: A Visual Survey of Visualization Techniques for Time-Oriented Data": TimeViz; Last Updated: Nov. 28, 2013; pp. 1-15; <http://survey.timeviz.net/>.

Tufte, Edward, "Sparkline theory and practive Edward Tufte", Edward Tufte Forum; Printed on Apr. 24, 2015; pp. 1-43; <http://www.edwardtufte.com/bboard/q-and-a-fetch-msg?msg_id=0001OR>.

Wicklin et al., "Congestion in the sky: Visualizing Domestic Airline Traffic with SAS Software"; Stat-Computing; 2009; Printed on Apr. 24, 2015; p. 1; <http://stat-computing.org/dataexpo/2009/posters/wicklin-allison.pdf>.

List of IBM Patents or Patent Applications Treated as Related, Appendix P, Filed Herewith, 2 pages.

Barry, et al., "Visualization of Cyclical Patterns in Metric Data", U.S. Appl. No. 14/931,907, filed Nov. 4, 2015, (a copy is not provided as this application is available to the Examiner).

\* cited by examiner

US 10,601,685 B2

VISUALIZATION OF CYCLICAL PATTERNS IN METRIC DATA

BACKGROUND OF THE INVENTION

The present invention relates generally to the field of performance monitoring applications, and more particularly to the visualization of patterns found in metric data.

Performance monitoring programs ensure that goals are consistently being met in an effective and efficient manner by monitoring and measuring relevant performance metrics. Workflow is monitored to detect, diagnose, remedy, and report on application performance issues to ensure that application performance meets or exceeds the expectations of end-users and businesses. Performance monitoring programs can identify bottlenecks and quickly identify the root cause of a performance issue.

A sparkline is a very small line chart, typically drawn without axes or coordinates. Sparklines present the general shape of the variation (typically over time) in some measurement, such as temperature or stock market price, in a simple and highly condensed way. Sparklines are small enough to be embedded in text. Several sparklines may be grouped together as elements of a small multiple, a series of similar graphs or charts using the same scale and axes for easy comparison. Whereas a typical chart is designed to show as much data as possible and is separate from the text, sparklines are designed to show data in an efficient, condensed manner in order to quickly convey general patterns in the data.

SUMMARY

Aspects of the present invention disclose a method for visualizing cyclical patterns in metric data. The method includes receiving, by one or more processors, data relating to a computer environment. The method further includes creating, by one or more processors, a visualization, wherein the visualization presents the data in a first format. The method further includes causing, by one or more processors, the visualization to be displayed in a user interface. The method further includes receiving, by one or more processors, an indication of a user interaction in the user interface, wherein the user interaction indicates an alternative visualization of the data, wherein the alternative visualization presents the data in a second format that includes a fragment of the received data. The method further includes creating, by one or more processors, the alternative visualization.

DETAILED DESCRIPTION

Embodiments of the present invention recognize that comparing common patterns of time series data for a given cyclical period of time (e.g., a specific hour of each day of every week) can be difficult for a user, especially if the user desires specific information. If a user "zooms out" (e.g., expands the view of a graph), the user will typically lose resolution of metric details. Embodiments of the present invention allow for quick and easy visualization of time-series data without losing resolution to sparkline chart(s). Additionally, embodiments of the present invention enable the user to view the data in an alternate format. Some embodiments of the present invention may include one, or more, of the following features, characteristics, and/or advantages: (i) quick identification of anomalous data, (ii) identification and comparison of common patterns in a cyclical period of time, (iii) allowing the user to view sparklines in a calendar view, (iv) allowing the user to select a sparkline of interest and locate other occurrences in a data set with the same or similar sparklines, (v) enhancing readability of sparkline charts, (vi) allowing for the exclusion of periods of time and data the user is not interested in, and (vii) allowing the user the ability to manipulate the sparklines in any way over time.

The present invention will now be described in detail with reference to the Figures.

Figure 1:
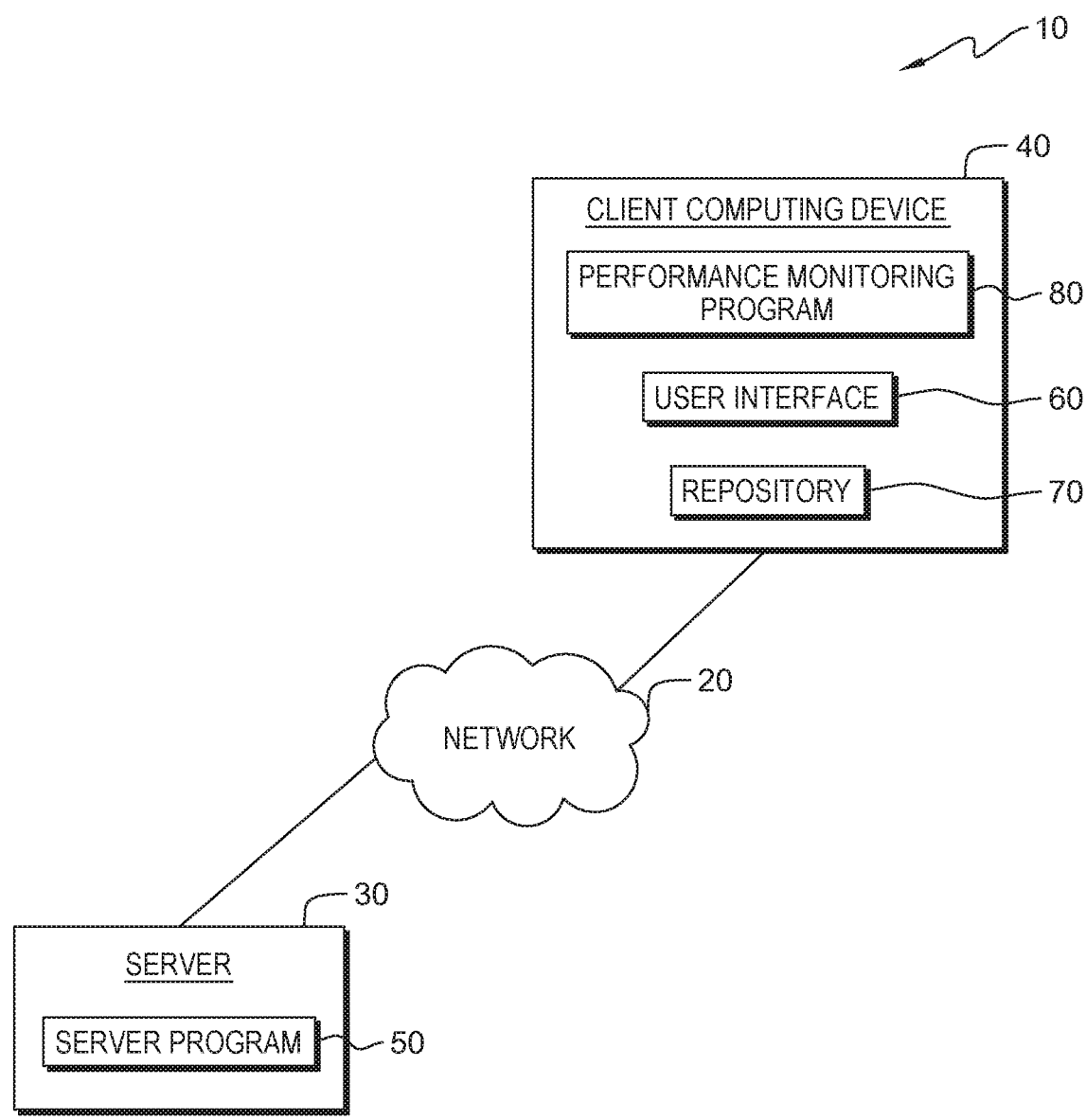
FIG. 1 depicts a functional block diagram illustrating a computing environment, in accordance with an embodiment of the present invention.

FIG. 1 depicts a diagram of computing environment 10 in accordance with one embodiment of the present invention. FIG. 1 provides an illustration of one embodiment and does not imply any limitations with regard to the environments in which different embodiments may be implemented.

In the depicted embodiment, computing environment 10 includes server 30 and client computing device 40 interconnected over network 20. Network 20 may be a local area network (LAN), a wide area network (WAN) such as the Internet, any combination thereof, or any combination of connections and protocols that will support communications between server 30 and client computing device 40 in accordance with embodiments of the present invention. Network 20 may include wired, wireless, or fiber optic connections. Computing environment 10 may include additional computing devices, servers, or other devices not shown.

Server 30 may be a management server, a web server, or any other electronic device or computing environment capable of processing computer readable program instructions, and receiving and sending data. In some embodiments, server 30 may be a laptop computer, tablet computer, notebook computer, personal computer (PC), a desktop computer, or any programmable electronic device capable of communicating with client computing device 40 via network 20. In other embodiments, server 30 may represent a server computing environment utilizing multiple computers as a server system, such as in a cloud computing environment. In another embodiment, server 30 represents a computing environment utilizing clustered computers and components to act as a single pool of seamless resources. In an embodiment, server 30 contains server program 50. Server 30 may include components as depicted and described in further detail with respect to FIG. 5.

Server program 50 operates as a generic program on server 30. In an embodiment, server program 50 sends performance data to repository 70. In another embodiment, server program 50 sends performance data to performance monitoring program 80. In other embodiments, server program 50 sends performance data to repository 70 and performance monitoring program 80 simultaneously. In an embodiment, server program 50 automatically sends performance data to repository 70 and/or performance monitoring program 80. In another embodiment, server program 50 receives a request from performance monitoring program 80 to send performance data to performance monitoring program 80. In an embodiment, server program resides on server 30. In another embodiment, server program 50 resides on another server or another computing device, provided server program 50 has access to repository 70 and performance monitoring program 80.

Client computing device 40 may be a desktop computer, laptop computer, tablet computer, personal digital assistant (PDA), or smart phone. In general, client computing device 40 may be any electronic device or computing system capable of executing computer readable program instructions, and communicating with server 30 over network 20. In an embodiment, client computing device 40 contains user interface (UI) 60, repository 70, and performance monitoring program 80. Client computing device 40 may include components, as depicted and described in further detail with respect to FIG. 5.

UI 60 operates on client computing device 40 to visualize content, such as menus and icons, and to allow a user to interact with an application accessible to client computing device 40. In an embodiment, UI 60 comprises an interface to performance monitoring program 80. In an embodiment, UI 60 displays data received from performance monitoring program 80. In another embodiment, UI 60 sends input to performance monitoring program 80. In other embodiments, UI 60 accepts input from users of client computing device 40. In an embodiment, UI 60 comprises one or more interfaces, such as an operating system interface and/or application interfaces. In an embodiment, a user (through input via UI 60) of client computing device 40 communicates with performance monitoring program 80. In other embodiments, a user (through input via UI 60) of client computing device 40 utilizes performance monitoring program 80 to communicate with server program 50 via network 20.

Repository 70 may be written to, read from, and accessed by server program 50 and/or performance monitoring program 80. In an embodiment, repository 70 receives data, such as metadata. In an embodiment, repository 70 receives data about generated alarms from performance monitoring program 80. In another embodiment, repository 70 receives data from server program 50. Metadata (or "metacontent") is defined as data providing information about one or more aspects of other data. For example, a photograph (or "photo") may contain metadata that indicates the size of the photo, the model of camera used to take the photo, the date the photo was taken, and any other information that describes the photo. In an embodiment, metadata about the alarm may include, but is not limited to, a timestamp of when the alarm was generated, the timeframe the alarm was generated, and the metrics that identified the issue that generated the alarm. The metadata of an alarm may include the following: a timestamp, a resource name (e.g., web_server_1), a metric name (e.g., Percent_CPU_Usage), a value (e.g., 99), and a Severity (e.g., High).

In an embodiment, repository 70 automatically stores data received from server program 50 and/or performance monitoring program 80. For example, performance monitoring program 80 generates metadata for an alarm that went off. Repository 70 automatically receives and stores the metadata generated by performance monitoring program 80. In other embodiments, a user (through input via UI 60) manually stores data generated by server program 50 and/or performance monitoring program 80 to repository 70. In some embodiments, repository 70 resides on client computing device 40. In other embodiments, repository 70 may reside on another server, or another computing device, provided that repository 70 is accessible to server program 50 and performance monitoring program 80.

Performance monitoring program 80 operates to monitor metrics of systems and applications on server 30. In an embodiment, performance monitoring program 80 receives and monitors data stored in repository 70. In another embodiment, performance monitoring program 80 receives and monitors data from server program 50. In an embodiment, performance monitoring program 80 observes time-based patterns of behavior of systems and applications running on server 30 (e.g., over an extended period of time). For example, performance monitoring program 80 monitors the power consumption of server 30. While monitoring the power consumption, performance monitoring program 80 records time-based logs of the power consumption of server 30. In an embodiment, performance monitoring program 80 stores recorded observations to repository 70.

In an embodiment, performance monitoring program 80 creates alternate views of the generated data. The views generated by performance monitoring program 80 may include a calendar view with a sparkline and/or a series of sparklines. In an embodiment, each "cell" in a calendar view represents a day of the week and/or month. The sparkline(s) in a cell represents a specific metric(s) over a defined period of time. In an embodiment, in a series of sparklines, the sparklines are arranged from left to right. For example, performance monitoring program 80 displays the power consumption of each Monday during the month of March as a series of sparklines. The first sparkline represents the power consumption on the first Monday of March. The following sparkline represent the second Monday of the month and so forth.

In an embodiment, performance monitoring program 80 highlights (through input via UI 60) patterns similar to a sought pattern, if it exists in the historical data. For example, a user sees a particular sparkline pattern on the first Monday of June. Performance monitoring program 80 receives input from the user (through input via UI 60) to highlight any other days that have a pattern similar to, or the same as, the pattern generated for the first Monday of June. In an embodiment, performance monitoring program 80 identifies time-based behavior that is abnormal in comparison to past behavior. In an embodiment, performance monitoring program 80 allows a user to manipulate the sparklines in any way that the user wants in order to allow the user to make comparisons between sparklines.

In some embodiments, performance monitoring program 80 resides on client computing device 40. In other embodiments, performance monitoring program 80 may reside on another server, or another computing device, provided that performance monitoring program 80 is accessible to server program 50 and performance monitoring program 80 has access to repository 70.

Figure 2:
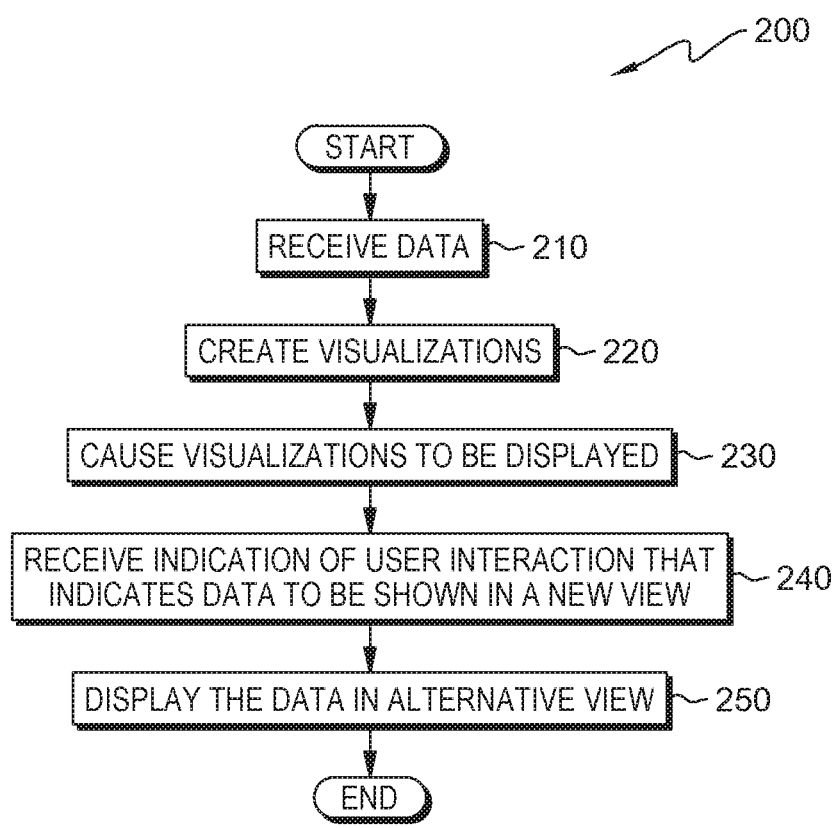
FIG. 2 depicts a flowchart of operational steps of a performance monitoring program for displaying data in alternate views, in accordance with an embodiment of the present invention.

FIG. 2 depicts a flowchart of operational steps 200 of performance monitoring program 80, executing within the computing environment of FIG. 1, in accordance with an embodiment of the present invention. Performance monitoring program 80 operates to receive data about generated alarms. Performance monitoring program 80 displays the data in the format of a calendar view and/or a series of sparklines or other graphical representation of data. Upon receiving input from a user, performance monitoring program 80 converts the existing visual format into an alternate visual format. Additionally, performance monitoring program 80 highlights abnormal patterns and can identify cyclic patterns in the historical data, if the patterns exist in the historical data.

In an embodiment, initially, a user of client computing device 40, through input via UI 60, opens performance monitoring program 80. The user, through UI 60 and performance monitoring program 80, monitors the performance of server 30. The user inputs the format of the visualizations the user wants to receive the data in.

In step 210, performance monitoring program 80 receives data. In an embodiment, performance monitoring program 80 receives data to identify and detect cyclic patterns and anomalous algorithms. Performance monitoring program 80 can receive data from server program 50 and/or repository 70. In an embodiment, performance monitoring program 80 identifies potential issues and generates metadata for alarms that are generated by anomalous algorithms. For example, performance monitoring program 80 monitors the power consumption of server 30. When performance monitoring program 80 detects an anomalous algorithm generated by server program 50, performance monitoring program 80 generates metadata about a generated alarm to notify users of anomalous activity. The metadata includes, but is not limited to, a timestamp of when an alarm is generated, the timeframe the alarm is generated, and the metrics involved in the generated alarm. The metrics involved may include, but are not limited to, web server response time, server memory usage, and router traffic load (in/out total bytes). In an embodiment, the timeframe is an increment of time pre-selected by the user. In another embodiment, the timeframe is an increment of time selected by the user after the alarm is generated. In other embodiments, the timeframe is a default increment of time. For example, performance monitoring program 80 generates metadata for a generated alarm. Performance monitoring program 80 generates a timestamp at 6:05 PM to identify to the user that the anomaly was detected at 6:05 PM. Performance monitoring program 80 lists Monday, from 6-8 PM, as the timeframe the anomaly was detected. In an embodiment, performance monitoring program 80 generates time series data for a generated alarm. The time series data is associated with the respective metrics over a period of time (e.g., a calendar month). In an embodiment, performance monitoring program 80 automatically stores generated alarm metadata to repository 70. In an embodiment, performance monitoring program 80 generates metadata for the data that performance monitoring program 80 receives that was generated by server program 50.

In step 220, performance monitoring program 80 creates visualizations. In an embodiment, performance monitoring program 80 creates visualizations in a calendar view with sparklines. In an embodiment, the calendar view includes cells that represent days (one cell represents one day) and within each cell, a sparkline showing the values of one or more metric(s) on that day. For example, performance monitoring program 80 creates a calendar view for the month of March that includes sparklines for each day in March. Each day illustrates the metric data within each respective 24-hour period, using sparklines for the visualization of the metric data. In other embodiments, the calendar view can include any graphical depiction of data, such as a bar chart.

It should be noted that in certain embodiments, the data used by performance monitoring program 80 to create sparklines can also be used to create traditional line charts. For example, where sparklines may be beneficial in visualizing data in a condensed and streamlined way, a line chart may be helpful in visualizing the same data in a more detailed and granular way. Further, in some cases, sparklines may be combined with a traditional line chart to form a hybrid line chart that includes sparklines arranged in a horizontal or vertical series. For example, in an embodiment, performance monitoring program 80 generates a fragmented line chart view with sparklines for the power consumption of server 30 on Mondays from 6 PM to 8 PM for the month of March. In other words, instead of including sparklines for every day in March, performance monitoring program 80 generates a view that includes a subset of sparklines that meet a selected metric (specifically, Mondays from 6 PM to 8 PM for the month of March). Performance monitoring program 80 arranges the sparklines in a series starting with the sparkline that represents the selected metric on the first Monday of the month and ending with the sparkline representing the selected metric on the last Monday of the month. The user sees each sparkline generated for the selected metric for each Monday during the month of March. In another embodiment, the series of sparklines is arranged vertically.

In an embodiment, performance monitoring program 80 identifies, by highlighting, cyclic patterns that occur in the historical data of the metric data. In an embodiment, performance monitoring program 80 searches the historical data to identify cyclic patterns. In another embodiment, performance monitoring program 80 searches a selected timeframe (e.g., past year) to identify cyclic patterns. For example, performance monitoring program 80 identifies three days during the month of March that match a particular pattern. In an embodiment, performance monitoring program 80 highlights anomalous patterns. For example, performance monitoring program 80 highlights the days in the month of March that show anomalous activity. In other embodiments, performance monitoring program 80 simultaneously highlights cyclic patterns and anomalous patterns. In an embodiment, performance monitoring program 80 utilizes different colored sparklines to differentiate between normal patterns, cyclic patterns, and anomalous patterns. For example, performance monitoring program 80 uses blue sparklines to identify normal patterns, green sparklines to identify cyclic sparklines, and red sparklines to identify anomalous patterns. In an embodiment, performance monitoring program 80 stores the generated view to repository 70.

In step 230, performance monitoring program 80 causes the generated visualizations to be displayed. In an embodiment, performance monitoring program 80 displays the generated visualization(s) to the user via UI 60. In an embodiment, the generated visualization(s) is rendered on an HTML canvas using JavaScript (or suitable WebKit alternative) that supports a wide variety of interactions, including, for example, touch via event listeners. (Note: the terms "JavaScript" and "WebKit" may be subject to trademark rights in various jurisdictions throughout the world and are used here only in reference to the products or services properly denominated by the marks to the extent that such trademark rights may exist.)

In step 240, performance monitoring program 80 receives an indication of user interaction. In an embodiment, performance monitoring program 80 receives an indication of user interaction (through input via UI 60) that the user wants performance monitoring program 80 to display data in an alternate view. Some examples of such user interactions may include, for example: (i) the user using a computer mouse connected to client computing device 40 to click on a button for displaying an alternate view; (ii) the user speaking the words, "please display an alternate view," into a microphone connected to client computing device 40; and/or (iii) the user using a touchscreen of UI 60 to select a group of sparklines that the user wishes to display in an alternate view. It should be noted, however, that these examples are not meant to be limiting, and that the user indication may occur in a wide variety of ways known (or yet to be known) in the art.

In an embodiment, performance monitoring program 80 generates a calendar view visualization. Upon the user viewing the visualization, performance monitoring program 80 receives input from the user to generate a series of sparklines to include in the calendar view visualization. In another embodiment, performance monitoring program 80 receives input from the user to change a visualization of a calendar view with sparklines into a line chart view (with or without sparklines). In yet another embodiment, performance monitoring program 80 receives input from the user to change a visualization of series of sparklines in a line chart view into a calendar view with sparklines. In other embodiments, performance monitoring program 80 can change other types of graphs and charts into any alternate graph or chart a user selects for the data to be shown in.

In an embodiment, performance monitoring program 80 receives input from the user to highlight time-repeated queries of a specific period of time. In an embodiment, performance monitoring program 80 receives input from the user to convert the highlighted portions of the visualization into a different visualization format, omitting the non-highlighted portions of the visualization. For example, performance monitoring program 80 displays a calendar view of sparklines for the month of March. Performance monitoring program 80 receives input from the user to highlight the data generated by performance monitoring program 80 on Mondays from 8 AM-9 AM during the month of March. Afterward, performance monitoring program 80 receives input from the user to convert the highlighted portions of the calendar view into a series of sparklines, omitting the non-highlighted data. Performance monitoring program 80 generates a series of sparklines visualization that only contains data highlighted in the calendar view.

In step 250, performance monitoring program 80 displays the data in an alternate view to the user. In an embodiment, performance monitoring program 80 displays the alternate view, via UI 60, to the user. The user can interact with the alternate view via UI 60. For example, in certain embodiments, the original visualization created in step 220 can be associated with the alternate view via "brushing and linking." "Brushing and linking" refers to an association where two or more different types of view of the same data are linked, such that a change in the representation of one view affects the representation in the other view(s). For example, a set of data is shown in two different representations, a line chart and a pie chart. Changes made to the data set are reflected in both representations of the data set. The same data is changed or altered, but the visualizations are represented in different formats. Processing ends when the user completes task(s).

Figure 3:
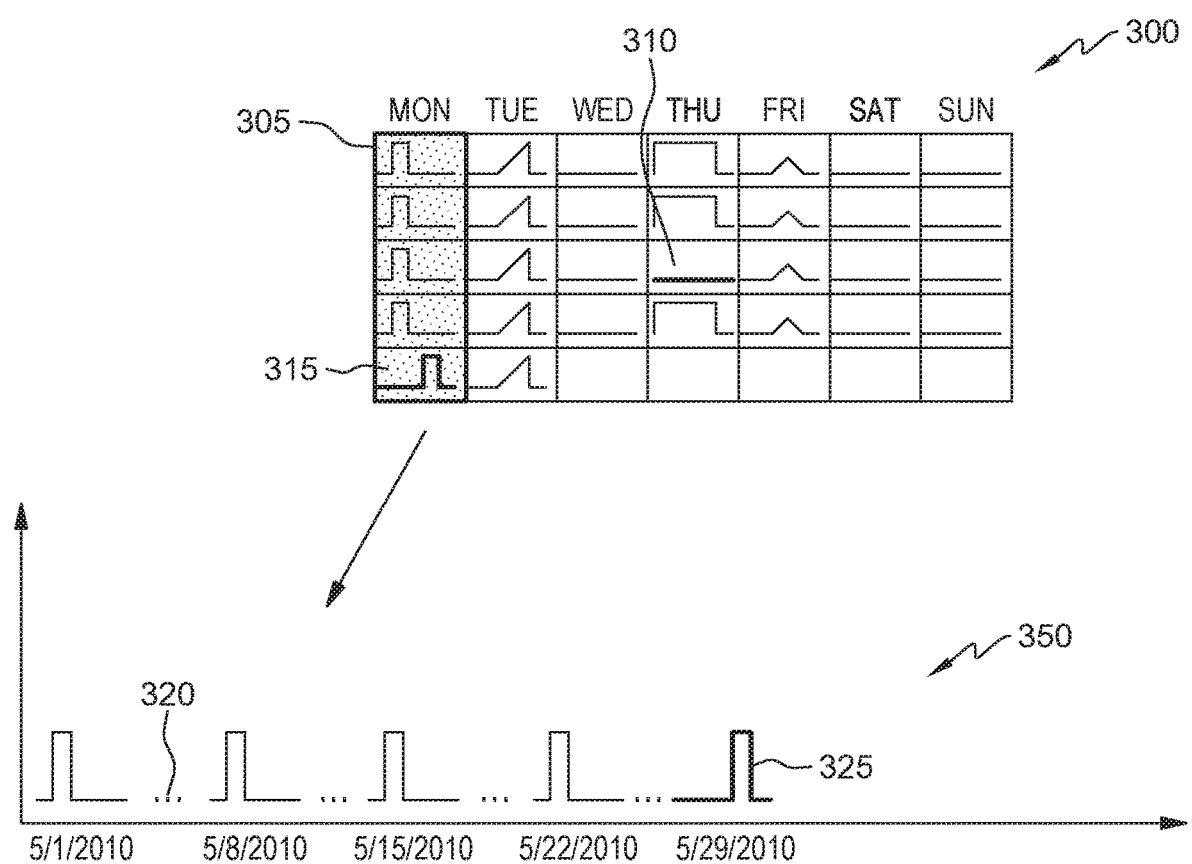
FIG. 3 depicts an exemplary screenshot view generated using a performance monitoring program via a user interface, in accordance with an embodiment of the present invention.

FIG. 3 is a depiction of performance monitoring program 80 converting the highlighted portions of a calendar view into a series of sparklines, omitting the non-highlighted data. Performance monitoring program 80 displays calendar view 300 for the month of May 2010 for a user. Performance monitoring program 80 receives input from the user to highlight all "Monday" cells for the month of May 2010. Performance monitoring program 80 highlights "Monday" column 305 in calendar view 300. Performance monitoring program 80 generates dots inside of the cells of "Monday" column 305 to highlight the cells. After highlighting "Monday" column 305, performance monitoring program 80 receives input from the user to identify anomalous metric activity recorded during May of 2010. Performance monitoring program 80 generates bold sparklines for cell 310 and cell 315 to indicate cell 310 and cell 315 are anomalous sparklines. After displaying the data in calendar view 300 for the user, performance monitoring program 80 receives input from the user to convert the highlighted cells, "Monday" column 305, into a series of sparklines, omitting the non-highlighted cells. Performance monitoring program 80 converts and displays "Monday" column 305 into sparkline series 350, using ellipsis 320 between each sparkline to indicate omitted data. The non-highlighted cells from calendar view 300 are the data that is omitted from sparkline series 350 that is displayed to the user. Performance monitoring program 80 displays sparkline 325 as a bold sparkline to indicate that sparkline 325 is an anomalous sparkline in sparkline series 350.

Figure 4:
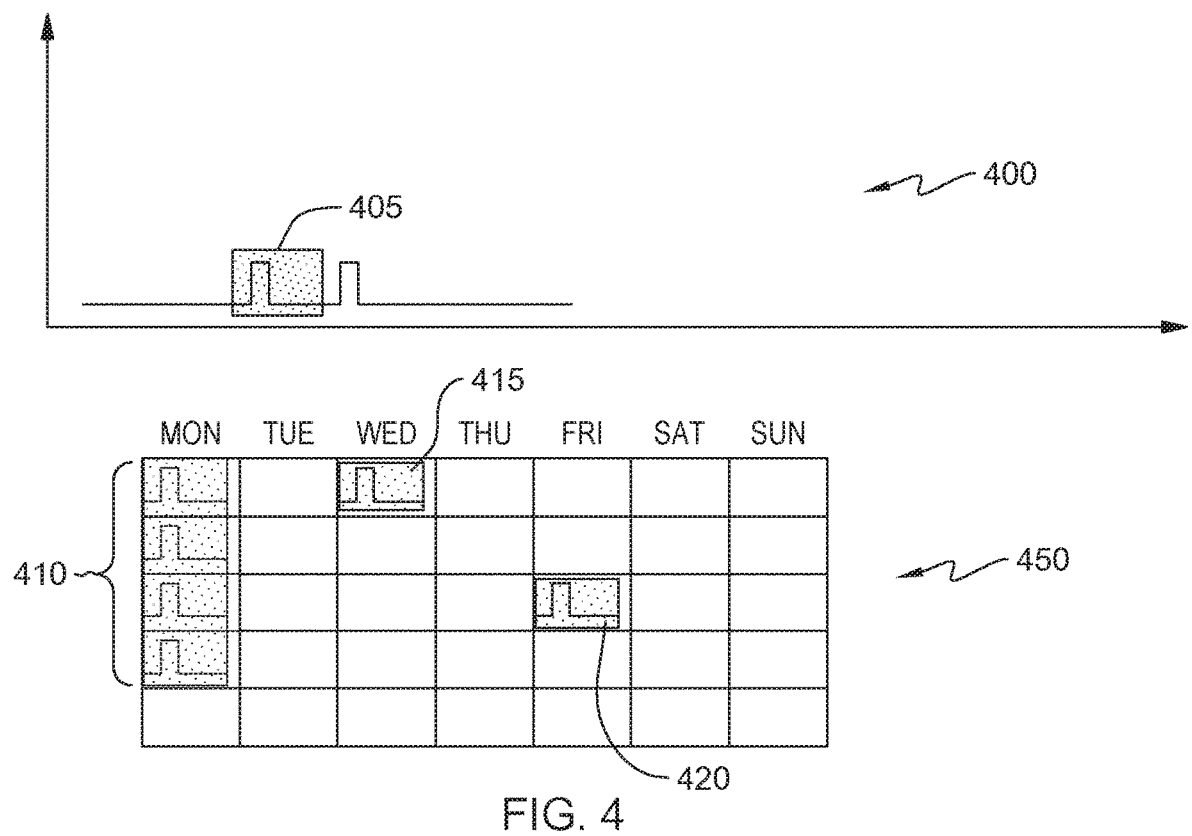
FIG. 4 depicts an exemplary screenshot view generated using a performance monitoring program via a user interface, in accordance with an embodiment of the present invention.

FIG. 4 is a depiction of performance monitoring program 80 identifying cyclic patterns. Performance monitoring program 80 displays sparkline series 400 for a user. Performance monitoring program 80 receives input from the user (through input via UI 60) to convert sparkline series 400 into calendar view 450 and to highlight sparklines that match the same pattern of sparkline 405. Performance monitoring program 80 displays the month of May 2010 in calendar view 450. Performance monitoring program 80 highlights all sparklines in calendar view 450 (column 410, cell 415, and cell 420) that match the pattern of sparkline 405.

Figure 5:
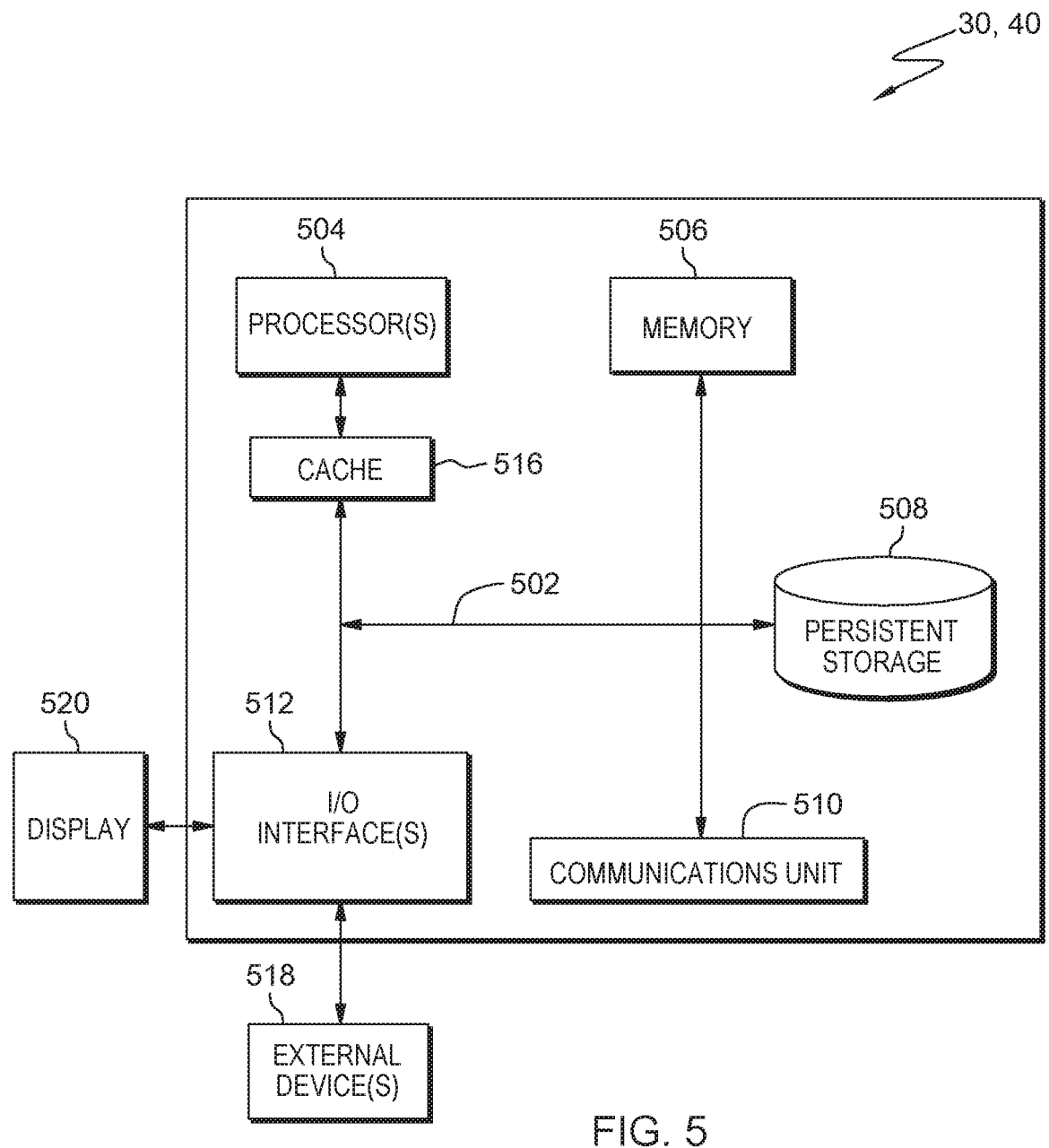
FIG. 5 is a block diagram of components of the server and client computing device of FIG. 1, in accordance with an embodiment of the present invention.

FIG. 5 depicts a block diagram of components of server 30 and client computing device 40, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Server 30 and client computing device 40 may each include communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Server program 50 may be stored in persistent storage 508 of server 30 and in memory 506 of server 30 for execution by one or more of the respective computer processors 504 via cache 516. User interface (UI) 60, repository 70, and performance monitoring program 80 may each be stored in persistent storage 508 of client computing device 40 and in memory 506 of client computing device 40 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Server program 50 may be downloaded to persistent storage 508 of server 30 through communications unit 510 of server 30. UI 60, repository 70, and performance monitoring program 80 may be downloaded to persistent storage 508 of client computing device 40 through communications unit 510 of client computing device 40.

I/O interface(s) 512 allows for input and output of data with other devices that may be connected to server 30 or client computing device 40. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., server program 50, can be stored on such portable computer readable storage media and can be loaded onto persistent storage 508 of server 30 via I/O interface(s) 512 of server 30. I/O interface (s) 512 also connect to a display 520. Software and data used to practice embodiments of the present invention, e.g., UI 60, repository 70, and performance monitoring program 80, can be stored on such portable computer readable storage media and can be loaded onto persistent storage 508 of client computing device 40 via I/O interface(s) 512 of client computing device 40. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for visualizing cyclical patterns in metric data, the method comprising:
   receiving, by one or more processors, data relating to a computer environment;
   creating, by one or more processors, a visualization, wherein the visualization presents the data in a first format;
   causing, by one or more processors, the visualization to be displayed in a user interface; receiving, by one or more processors, an indication of a user interaction in the user interface, wherein the user interaction indicates an alternative visualization for the data, wherein the alternative visualization presents the data in a second format that includes a fragment of the received data; and
   creating, by one or more processors, the alternative visualization, wherein the alternative visualization displayed as a calendar view in the user interface includes a sparkline series to represent the data relating to the computer environment.

2. The method of claim 1, wherein the data includes metadata of an alarm that is generated in the computer environment.

3. The method of claim 2, wherein the metadata includes one or more of: a timestamp when the alarm is generated, a timeframe the alarm is generated, and metrics involved in the generated alarm.

4. The method of claim 1, wherein the fragment includes only data relating to a specific timeframe.

5. The method of claim 1, wherein the fragment includes only data relating to a common metric value.

6. The method of claim 1, wherein the visualization displayed in the user interface utilizes sparklines to represent the data relating to the computer environment.

7. The method of claim 1, wherein the user interaction is part of a brushing and linking process.

8. A computer program product for visualizing cyclical patterns in metric data, the computer program product comprising:
   one or more computer readable storage media; and
   program instructions stored on the one or more computer readable storage media, the program instructions comprising:
   program instructions to receive data relating to a computer environment; program instructions to create a visualization, wherein the visualization presents the data in a first format;
   program instructions to cause the visualization to be displayed in a user interface;
   program instructions to receive an indication of a user interaction in the user interface, wherein the user interaction indicates an alternative visualization of the data, wherein the alternative visualization presents the data in a second format that includes a fragment of the received data; and
   program instructions to create alternative visualization, wherein the alternative visualization displayed as a calendar view in the user interface includes a sparkline series to represent the data relating to the computer environment.

9. The computer program product of claim 8, wherein the data includes metadata of an alarm that is generated in the computer environment.

10. The computer program product of claim 9, wherein the metadata includes one or more of: a timestamp when the alarm is generated, a timeframe the alarm is generated, and metrics involved in the generated alarm.

11. The computer program product of claim 8, wherein the fragment includes only data relating to a specific timeframe.

12. The computer program product of claim 8, wherein the fragment includes only data relating to a common metric value.

13. The computer program product of claim 8, wherein the visualization displayed in the user interface utilizes sparklines to represent the data relating to the computer environment.

14. The computer program product of claim 8, wherein the user interaction is part of a brushing and linking process.

15. A computer system for visualizing cyclical patterns in metric data, the computer system comprising:
one or more computer processors;
one or more computer readable storage media; and
program instructions, stored on the computer readable storage media for execution by at least one of the one or more processors, the program instructions comprising:
program instructions to receive data relating to a computer environment; program instructions to create a visualization, wherein the visualization presents the data in a first format;
program instructions to cause the visualization to be displayed in a user interface;
program instructions to receive an indication of a user interaction in the user interface, wherein the user interaction indicates an alternative visualization of the data, wherein the alternative visualization presents the data in a second format that includes a fragment of the received data; and
program instructions to create alternative visualization, wherein the alternative visualization displayed as a calendar view in the user interface includes a sparkline series to represent the data relating to the computer environment.

16. The computer system of claim 15, wherein the data includes metadata of an alarm that is generated in the computer environment.

17. The computer system of claim 16, wherein the metadata includes one or more of:
a timestamp when the alarm is generated, a timeframe the alarm is generated, and metrics involved in the generated alarm.

18. The computer system of claim 15, wherein the fragment includes only data relating to a specific timeframe.

19. The computer system of claim 15, wherein the fragment includes only data relating to a common metric value.

20. The computer system of claim 15, wherein the visualization displayed in the user interface utilizes sparklines to represent the data relating to the computer environment.

* * * * *